United States Patent

Wardlaw et al.

[11] Patent Number: 5,879,230
[45] Date of Patent: Mar. 9, 1999

[54] LOW PROFILE AIR INLET ASSEMBLY FOR VEHICLE AIR CONDITIONING SYSTEM

[75] Inventors: Kenneth Lawrence Wardlaw, Southfield; Brian Scott Ankrapp, Royal Oak, both of Mich.; Wayne Oliver Forrest, Gasport, N.Y.

[73] Assignee: General Motors Corporation, Detroit, Mich.

[21] Appl. No.: 70,803

[22] Filed: May 1, 1998

[51] Int. Cl.⁶ .................................................. B60H 3/06
[52] U.S. Cl. .............................. 454/139; 55/467; 454/158
[58] Field of Search .................................. 454/139, 158; 55/385.2, 385.3, 467, 471; 415/182.1

[56] References Cited

U.S. PATENT DOCUMENTS 5,062,352  11/1991  Ostrand .
5,391,112   2/1995  Wardlaw .............................. 454/139
5,399,120   3/1995  Burns et al. .

FOREIGN PATENT DOCUMENTS

0 380 453  8/1990  European Pat. Off. ............... 454/158
62-137222  6/1987  Japan ................................... 454/158
63-270213  11/1988  Japan ................................... 454/139

*Primary Examiner*—Harold Joyce
*Attorney, Agent, or Firm*—Patrick M. Griffin

[57] ABSTRACT

An air inlet assembly for the scroll housing of an automotive air conditioning and ventilation system is specially structurally matched to the scroll housing so as to be more compact and efficient. An inlet housing is fashioned coaxial to the scroll housing and blower, within which a coaxial, partially cylindrical door rotates around the central axis so as to open or close one of a pair of diametrically opposed air openings. An annular filter fits within the rotating door. Regardless of which air inlet is open, air that is pulled in by the blower is forced into a radial space between the filter and the door, three hundred and sixty degrees around, and is forced radially through the filter before entering the scroll housing. Because of the coaxial, matching relationship between inlet housing a scroll housing, the entire assembly is very compact and low in profile, as measured along the vertical co axis.

2 Claims, 7 Drawing Sheets

LOW PROFILE AIR INLET ASSEMBLY FOR VEHICLE AIR CONDITIONING SYSTEM

TECHNICAL FIELD

This invention relates to air inlet assemblies for vehicle heating, venting and air conditioning (HVAC) system, and specifically to a compact, low profile inlet assembly designed to mate efficiently to the blower scroll housing and to retain and improved air filter.

BACKGROUND OF THE INVENTION

Vehicle HVAC systems typically use a cylindrical, centrifugal blower which is driven about a central axis and contained within a scroll housing. The scroll housing is essentially coaxial to the blower axis, although its side wall is arrayed in a spiral of steadily increasing radius. At least the top wall of the scroll housing is substantially flat, and open to the center of the blower, so that it can physically mount an air inlet assembly, which is the most upstream structure of the system. The air inlet assembly is typically a box like structure, sometimes peaked on top like a house roof, with a fresh air opening that faces toward the under-hood space of the vehicle, and an opposed recirculation opening facing toward the vehicle interior. A flapper door swings back and forth, inside the inlet, selectively opening or closing the fresh air or recirculated air inlet to the system. Basically, a box shaped inlet is mated to a cylindrical blower and housing, which does not make for a compact, low profile assembly overall.

A relatively recent development in HVAC systems is the introduction of air filters, sometimes called pollen filters. These are usually flat structures, sometimes broken up into several pieces, which slide fit into the air duct work wherever there is access. Access is often difficult, requiring the use of dedicated access openings through the instrument panel. Access is often better just upstream of the fresh air inlet, under the hood, with the obvious drawback that only fresh inlet air is filtered. While the interior of air inlet assembly would be a desirable location for a filter, since it would be able to handle both fresh and recirculated air, the presence of the interior flapper door generally prevents such a filter location. One proposed design, disclosed in co assigned U.S. Pat. No. 5,391,112, changes the traditional box shape to a semi cylindrical shape, although it is not coaxial to the scroll housing. A door swings over the outside of the housing, allowing for a U shaped filter internal to the housing, where it can filter both air inlet flows. The filter is a flat piece, inserted through one opening of the inlet and bent into a U shape, providing approximately 180 degrees of filtering surface. The inlet is not significantly lower in profile or more compact than a conventional box shaped inlet, however.

SUMMARY OF THE INVENTION

The subject invention provides an inlet assembly which is lower in profile and more compact than the designs described above. In addition, it incorporates a unique internal filter which is easier to insert and remove, and which provides 360 degrees of filter surface.

In the preferred embodiment disclosed, the inlet housing is cylindrical in shape and coaxial to the blower housing, with a low profile perimeter wall having a lower edge fixed to the scroll housing's flat upper surface. A flat upper cover closes the upper edge of the housing perimeter wall. Two large, diametrically opposed inlets interrupt the housing perimeter wall, a forward facing fresh air inlet and a rear facing recirculation inlet. Although the two inlets together occupy much of the area of the perimeter wall, there are a pair of diametrically opposed, semi cylindrical webs left between the inlets.

Located inside the inlet housing, between the upper cover and the flat upper surface of the scroll housing, is a generally cylindrical door. The door includes a partially cylindrical flange which fits concentrically within the housing webs with a close radial clearance. The door also includes a flat upper shelf which makes a close axial clearance with the inner surface of the housing cover, and a flat lower shelf that has a close axial clearance with the flat upper surface of the scroll housing. The door lower shelf also has a central opening coaxial to the scroll blower and aligned with a matching opening in the scroll housing upper surface. The flange subtends just enough arc to register with and completely close either of the inlet housing inlets, while also circumferentially overlapping with both webs. An actuator rotates the door selectively to close either inlet, while leaving the other open. Because of the close radial and axial clearance between the inner surfaces of the housing and the outer surfaces of the coaxial rotatable door, air pulled in by the blower passes only through the open inlet, and not through the blocked inlet. The coaxial, axially low profile shape of the housing and door create a very compact air inlet.

In addition, the embodiment disclosed, a cylindrical filter can be inserted inside the door and coaxial thereto, axially tight between the door shelves, with a radial clearance from the inner surface of the door flange. The filter fits easily through the fresh air inlet and inside the door registered therewith. With the filter, air drawn into either housing inlet can travel completely around the entire outer surface of the filter, through both the open housing inlet and through the radial clearance with the door flange, and then radially through the filter before reaching the blower. Both fresh and recirculated air are filtered through the maximum available filter surface area, but the low profile of the inlet assembly is maintained.

BRIEF DESCRIPTION OF THE DRAWINGS

These and other features of the subject invention will appear from the following written description, and from the drawings, in which.

DESCRIPTION OF THE PREFERRED EMBODIMENT

Figure 1:
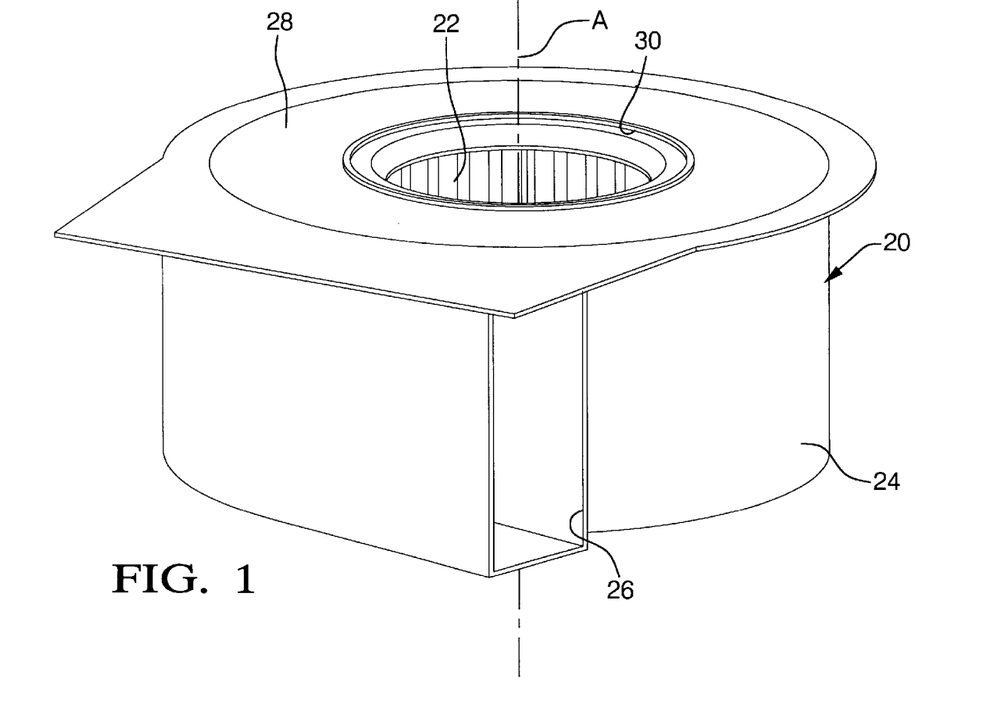
FIG. 1 is a perspective view of a scroll housing and central blower, showing the flat upper surface to which an inlet assembly would be fixed.
Figure 2:
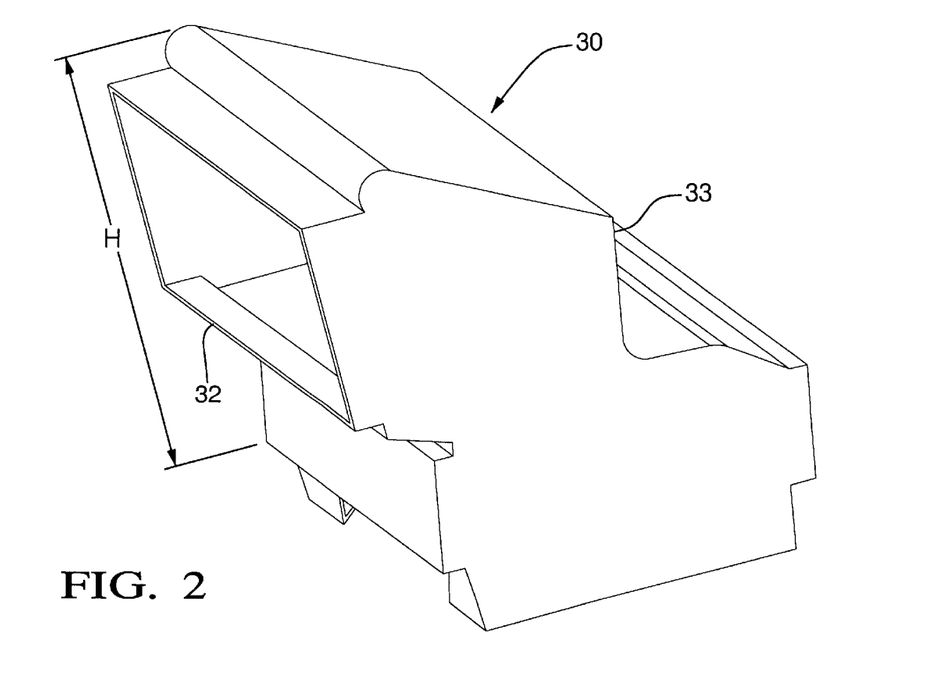
FIG. 2 is a perspective view of a conventional, box shaped inlet assembly.

Referring first to FIGS. 1 and 2, a typical scroll housing, indicated generally at 20, contains a conventional centrifugal blower 22, which is spun around its central axis A to pull air axially into its center and drive it radially outwardly. The scroll housing 20 has a spiral side wall 24, generally arrayed around the axis A, which terminates in a tangential side air outlet 26. As disclosed, and as is typical, the side wall 24 is displaced asymmetrically downwardly, so that the upper surface 28 of the scroll housing 20 can be flattened, and perpendicular to the axis A. This makes the attachment of an air inlet housing (described below) to the top of scroll housing 20 much easier, since, with a spiral side wall 24 that was symmetrical, neither the top nor bottom of the scroll housing could be flat. ("upper" and "lower" as applied to the end walls of the scroll housing 20 are arbitrary terms, of course, since the axis A could be other than vertical, although it usually vertical, as disclosed here) Although the side wall 24 is not perfectly cylindrical, the flat upper surface 28 is made basically circular, but for a forwardly flared area, so as to further simplify the attachment of the inlet housing described below. The flat upper scroll housing surface 28 also has a central opening 30, generally coaxial to axis A, through which air is axially pulled by blower 22 before being impelled radially outwardly, spiraling around side wall 24 before ultimately exiting at tangential outlet 26. An example of a conventional air inlet assembly of the type that would normally be affixed to scroll housing 20 is indicated generally at 32 in FIG. 2. Conventional air inlet 32 is generally box shaped, with a forward facing fresh air inlet 32, and rear facing recirculated air inlet 33. Being box shaped, air inlet assembly 32 does not mate structurally to cylindrical scroll housing 20 particularly efficiently, either in terms of air flow or compactness. Each inlet 32 and 33 sits well above the scroll housing upper surface 28, with a total height indicated at H. In essence, most of the necessary air inlet surface area is displaced well above the scroll housing 20, occupying a significant distance in the vertical direction of the vehicle body, an area which is increasingly constrained as vehicle hood lines become ever lower.

Figure 3:
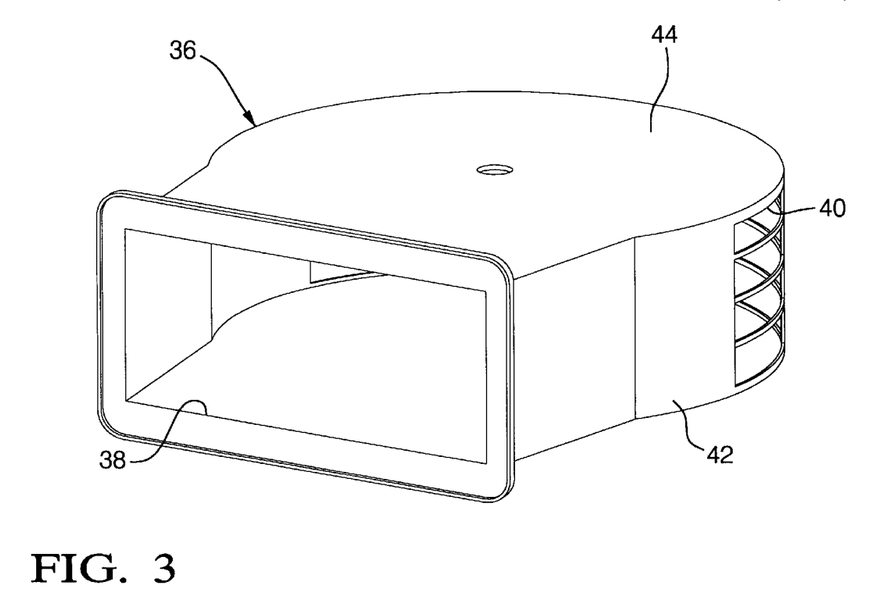
FIG. 3 is a perspective view of the inlet housing alone, showing the fresh air inlet.
Figure 4:
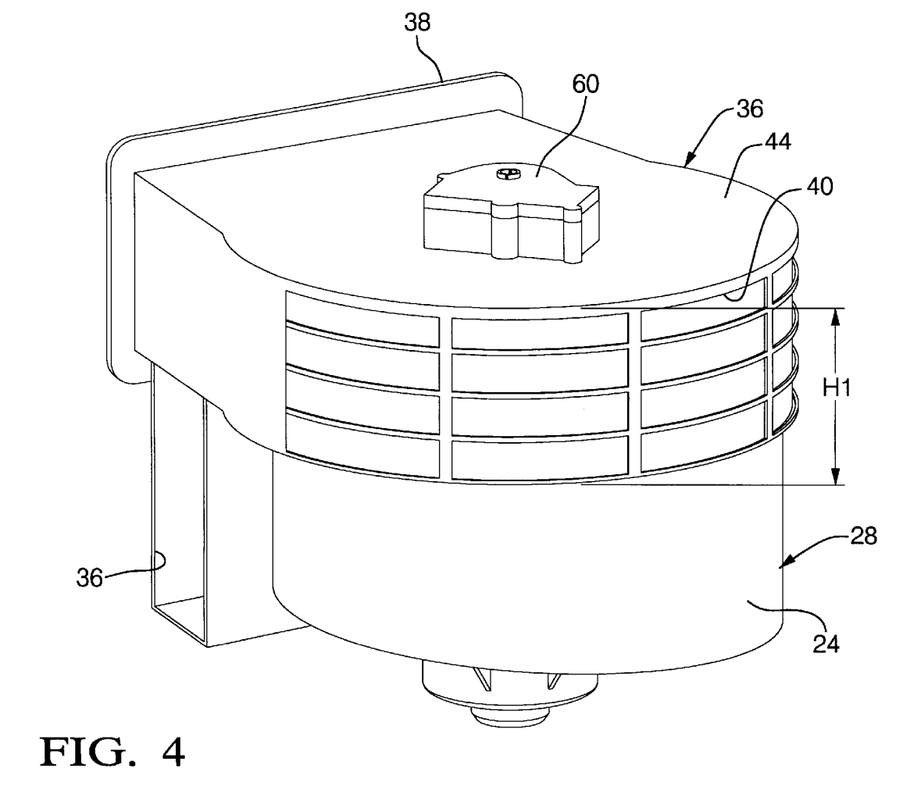
FIG. 4 is a perspective view of the inlet housing attached to the scroll housing, showing the recirculated air inlet.

Referring next to FIGS. 3 and 4, an inlet housing, indicated generally at 36, is a hollow, basically cylindrical part which, unlike the air inlet 32 described above, is designed to efficiently match the shape of the scroll housing 20. As such, inlet housing 36 includes a generally cylindrical perimeter wall, substantially equal in diameter to the scroll housing flat upper surface 28, the majority of which is actually removed by the presence of a diametrically opposed pair of inlets. The inlets include an outwardly flared fresh air inlet 38 at the front and a recirculated air inlet 40 at the rear, each of which is wide in terms of subtended angle, leaving only a pair of relatively narrow, diametrically opposed, partially cylindrical webs 42 between the two inlets 38 and 40. In the embodiment disclosed, the upper edge of the inlet housing perimeter wall is closed by a flat cover 44, which is also generally circular. The matching diameter and shape of the inlet housing 36 and the scroll housing flat upper surface 28 described above allows the lower edge of the perimeter wall to be easily attached, as shown in FIG. 4, by any suitable means. Once done, the flat upper cover 44 is axially spaced above the scroll housing flat upper surface 28 by a known distance H1, which is the height of the perimeter wall, and substantially less than the equivalent height H of a conventional inlet housing as described above. This is because the needed inlet areas, provided by the inlets 38 and 40, have been provided around the diameter of housing 36, taking advantage of the arcuate width of the inlets 38 and 40, and using less height in the vertical direction for an equivalent or even greater area. Additional structure fits beneath the cover 44, within the lower profile inlet housing 36, described next.

Figure 5:
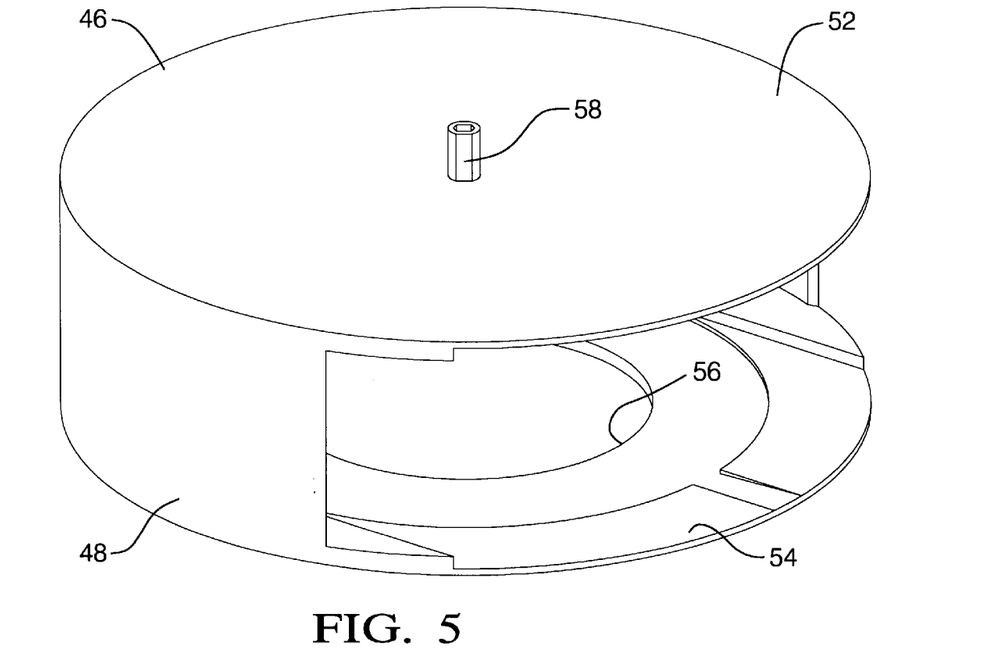
FIG. 5 is a perspective view of the top of the rotating door.
Figure 6:
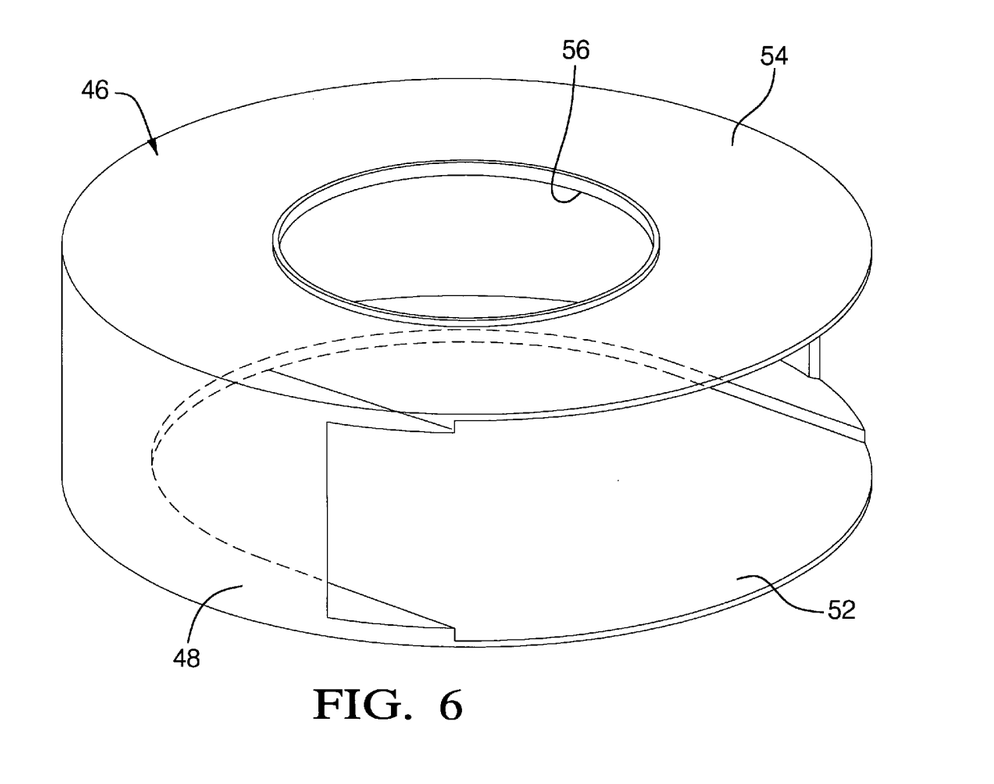
FIG. 6 is a perspective view of the bottom of the rotating door.

Referring next to FIGS. 4, 5 and 6, a rotating door, indicated generally at 46, fits closely within inlet housing 36. More specifically, door 46 includes a partially cylindrical flange 48, which has a diameter just slightly less than the diameter of the inlet housing webs 42, and an axial height just slightly less than H1 as defined above. A pair of flat, generally circular shelves close the upper and lower edges of door flange 48, an upper shelf 52 and a lower shelf 54, which is relieved by a central opening 56. Door 46 is once coaxially inside of housing 36 before it is attached to the scroll housing 20 as described above, with the two central openings 56 and 30 aligned. Once installed, the outer surfaces of the door shelves 52 and 54 have a close axial clearance from the inner surfaces of the housing cover 44 and scroll housing upper surface 28 respectively, and the outer surface of the flange 48 has a close radial clearance with the webs 42, as is described in more detail below. The coaxial position of door 46 is maintained by central key 58 on the upper shelf 52, which passes through the center of housing cover 44, on the axis A. A motor actuator 60 on cover 44 fits to key 58 to rotate door 46 back and forth coaxially within inlet housing 36. The angle subtended by the flange 48 is sufficient to circumferentially overlap with either housing inlet 38 or 40, while concurrently overlapping with the webs 42, as well.

Figure 7:
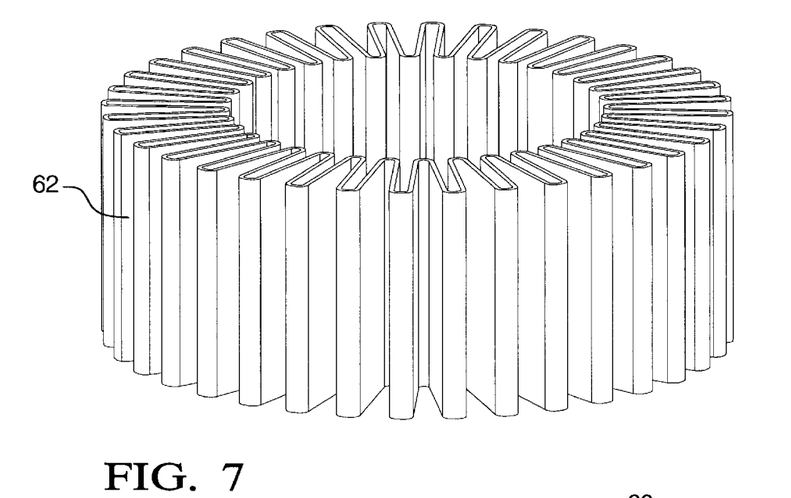
FIG. 7 is a perspective view of the filter alone.
Figure 8:
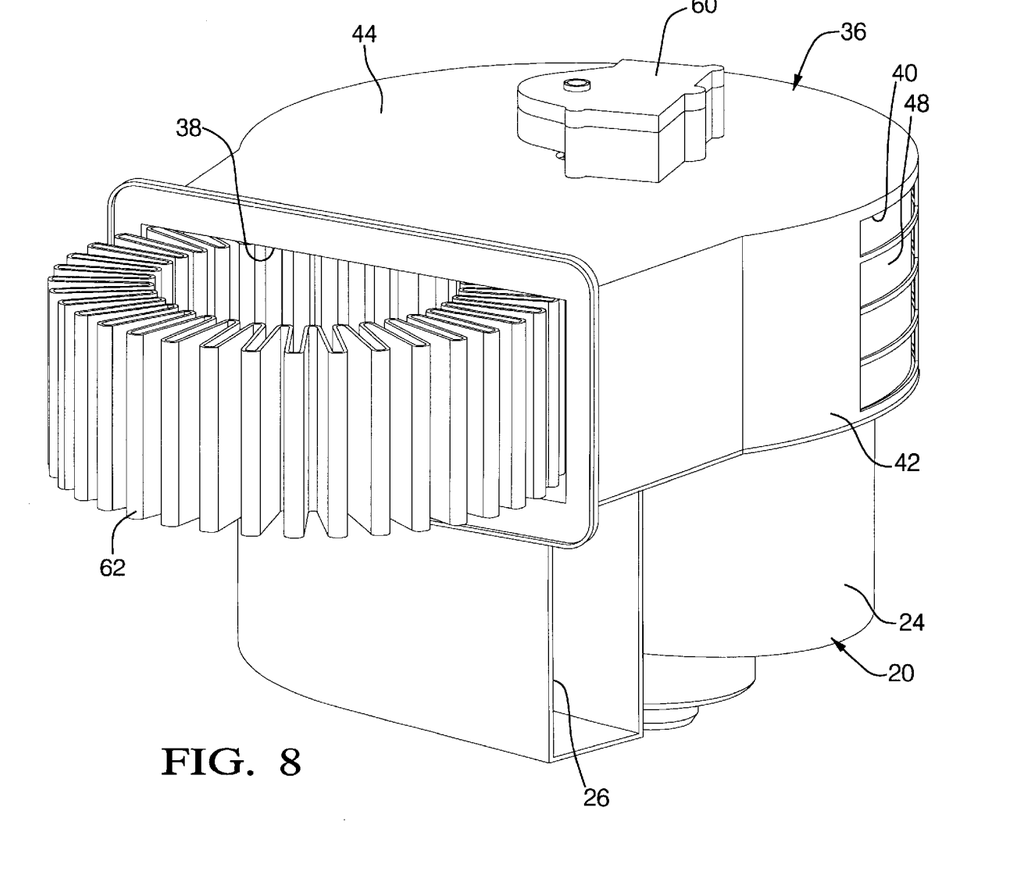
FIG. 8 is perspective view of the filter being inserted through the fresh air inlet of the housing and inside the rotating door.

Referring next to FIGS. 7 and 8, the final component is an annular filter 62, which is installed within and concentric to door 46, firmly between the two parallel shelves 52 and 54. The inner surfaces of the door shelves 52 and 54 may be molded with suitable locking ridges and ramps to guide the filter 62 into place and retain it. Filter 62 is an air filter, and may be made of any suitable annular layer or layers of paper or plastic filter material, charcoal, or any other suitable material designed to trap air particulates and chemicals. Filter 62 concentrically surrounds door central opening 56 without blocking it, and the outer surface of filter 62 is radially spaced from the inner surface of door flange 48 by significantly more than the radial clearance between the flange 48 and the housing webs 42, for a purpose described in more detail below. Filter 62 may be installed in door 46 before it is installed in housing 36, or, as shown in FIG. 8, it may be inserted through the housing fresh air inlet 38 (when inlet 38 is unblocked) and then between the door shelves 52 and 54. This allows filter 62 to be easily changed in the vehicle, with no dedicated access panels or openings.

Figure 9:
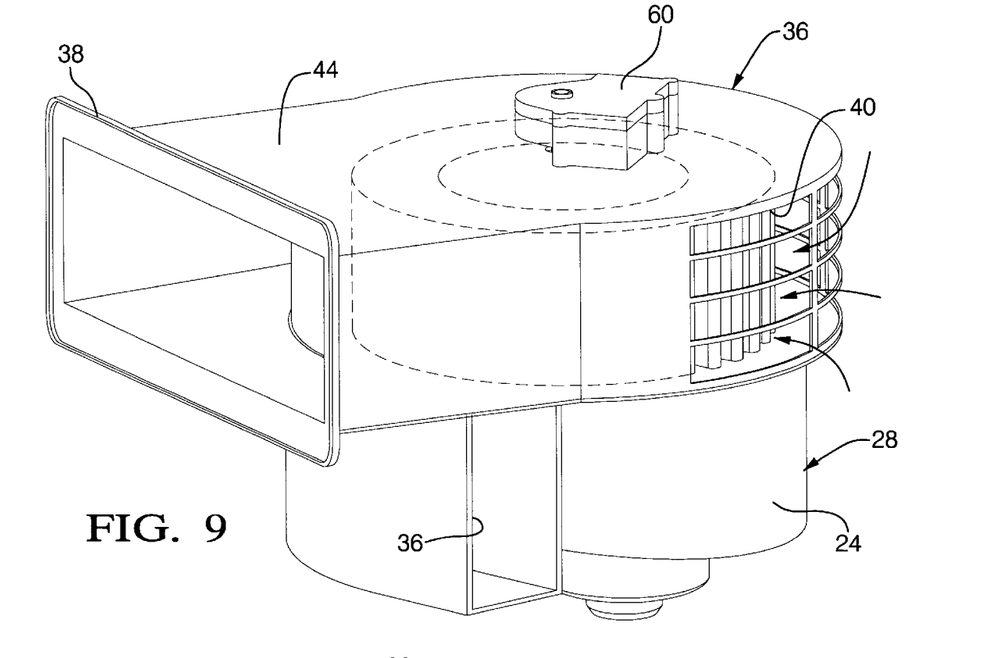
FIG. 9 is a perspective view of the side of inlet assembly with the recirculated air inlet open, showing the recirculated air flow.
Figure 10:
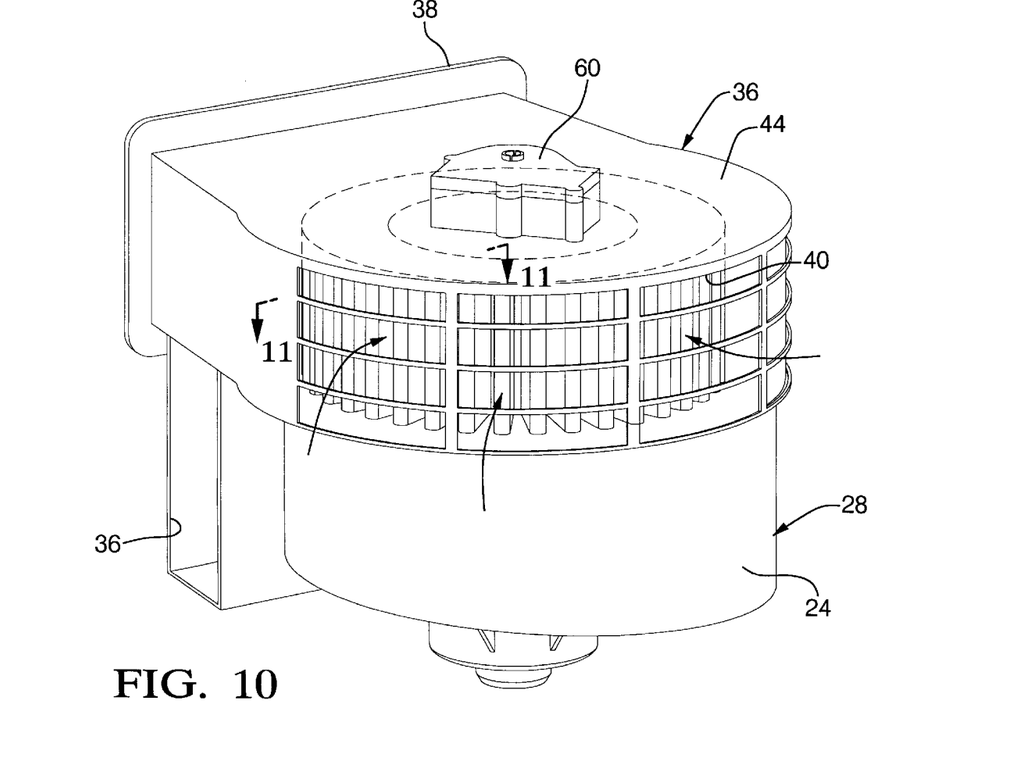
FIG. 10 is a perspective view of the rear of the inlet assembly with the recirculated air inlet open, also showing the recirculated air flow.
Figure 11:
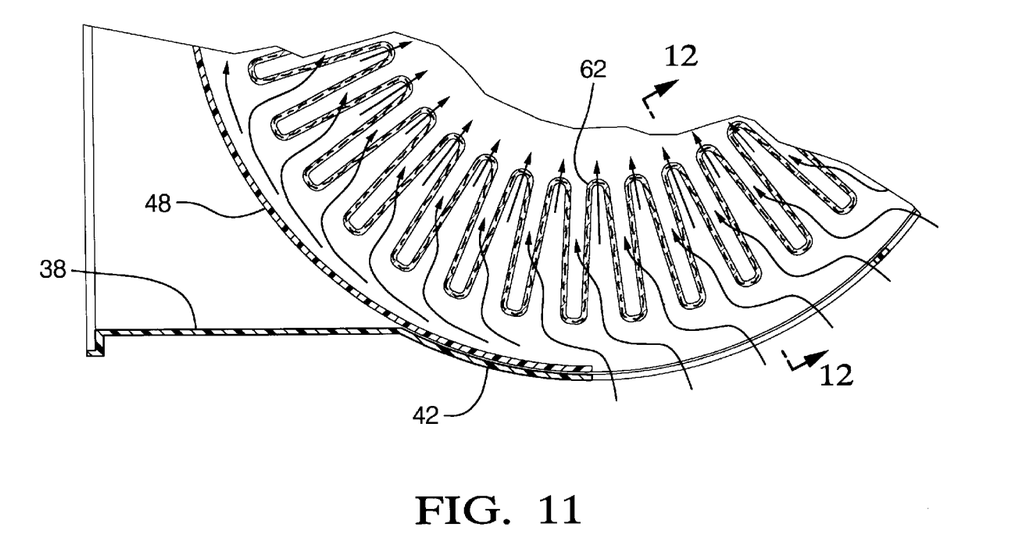
FIG. 11 is a cross section of FIG. 10 taken along the line 11—11, showing the close radial clearance between the inlet housing web and the door flange, and showing the radial clearance between the outside of the filter and the inside of the door forming a 360 degree plenum for air flow through the filter.
Figure 12:
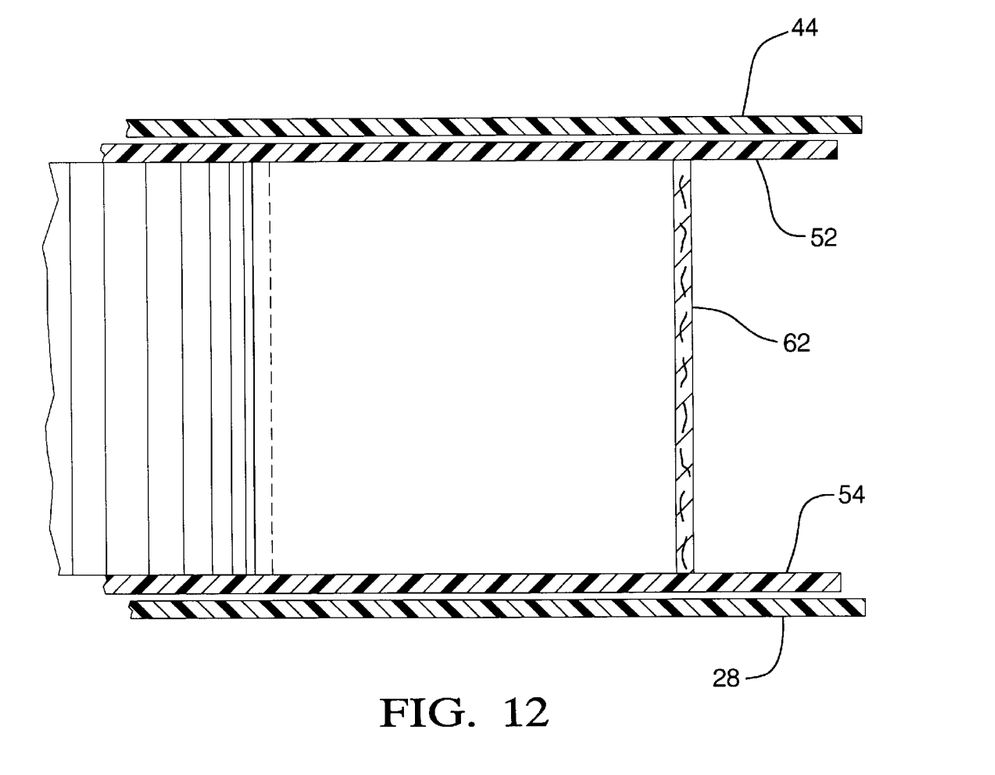
FIG. 12 is a cross section of FIG. 10 taken along the line 12—12, showing the close axial clearance between the outer surfaces of the door and the inner surfaces of the inlet housing and the scroll housing, and also showing the close axial fit between the filter and the inner surfaces of the door.

Referring next to FIGS. 9 through 12, the operation of the invention in the recirculated mode is illustrated. When installed in the vehicle, the fresh air inlet 38 would be abutted with a hole through a dash panel, with a suitable edge seal between, and would ultimately open to a conventional fresh air screen located just below the front windshield. The fresh air inlet 40 would be open to the vehicle interior, behind the instrument panel. This would be true of a conventional air inlet assembly, as well, but, because of the lower profile of inlet housing 36, the scroll housing upper surface 28 sits much closer to the inlets 38 and 40, and less far below the hood line, than would otherwise be the case. When recirculated air is desired, the actuator 60 turns door 46 (and concentric filter 62) within inlet housing 36 until the center of the door flange 48 is evenly registered with the fresh air inlet 38, blocking it, while leaving the recirculated air inlet 40 open. As seen in FIGS. 11, the ends of the door flange 48 concurrently overlap with the inlet housing webs 42, with a radial clearance close enough to prevent significant air flow therebetween. In addition, as seen in FIG. 12, the door shelves 52 and 54 continually have a close axial clearance with the housing cover 44 and the scroll housing upper surface 28. Therefore, when the blower 22 spins, a suction is created within scroll housing 20, which creates a low pressure within the interior of the door 46, through the through the aligned central openings 30 and 56. Because of the blockage of the fresh air inlet 38, and the close radial and axial clearances just noted, the only free entry path for make up air is through the open recirculated air inlet 40, as shown in FIGS. 9 and 10. Air enters the recirculate air inlet 40, flowing between the door shelves 52 and 54, and is pulled toward the aligned central openings 30 and 56, which are surrounded by the intervening filter 62, which is snugly fitted between the shelves 52 and 54. Therefore, air is forced 360 degrees around the outside of the filter 62, through the radial clearance it makes with the inner surface of the door flange 48. Ultimately, the air is pulled radially inwardly through the filter 62 and into the blower 22. Essentially all of the surface area of the filter 62 is used. The effective surface area is maximized within the housing 36, because filter 62 completely surrounds the aligned openings 30 and 56, and fills essentially the entire axial height within housing 36.

Figure 13:
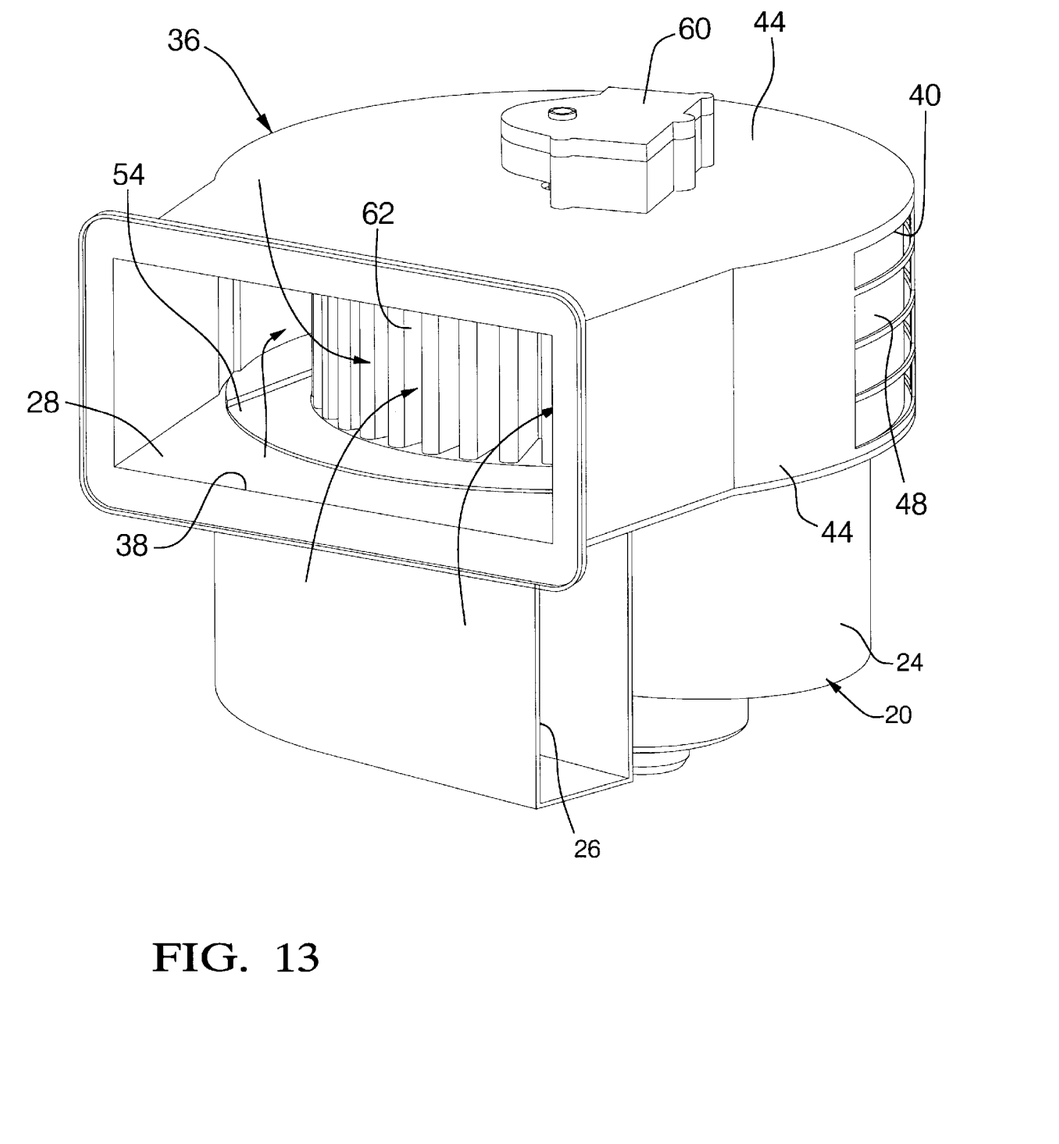
FIG. 13 is a perspective view of the side of the inlet assembly with the fresh air inlet open, showing the fresh air flow.

Referring finally to FIG. 13, the fresh air mode may be more briefly described. Actuator 60 turns door 46 until flange 48 is evenly registered with recirculated air inlet 40, blocking it and leaving fresh air inlet 38 open. The ends of the door flange 48 also overlap with the concentric webs 42, and the same close radial and axial clearances defined above obtain. Therefore, air is now pulled into the open fresh air inlet 38, and similarly flows around the filter 62, and ultimately radially therethrough and into the blower 22. Turning of the door flange 48, with the concentric filter 62 inside, is free and unencumbered, and also quick and relatively quiet, as compared to a conventional flapper door. The door 46 and filter 62 are both well protected within the housing 36, and every element described, housing 36, door 46, and filter 62, are all designed about the central axis A of the scroll housing 20 and blower 22, so as to fit and work with maximum compactness and efficiency. As noted, filter 62 is also simple to change.

Variations in the disclosed embodiment could be made. Filter 62 could be added or not, as desired, and easily left out in a vehicle where filtering was not desired. The operation of door 46 and the air flow pattern would be exactly the same, but with less pressure loss, which provides great flexibility across different car lines, or in different geographical areas and climatic conditions. Even with filter 62 present, door 46 could be much simpler in design, consisting of nothing more than the partially cylindrical flange 48, with the same diameter, but with no shelves 52 and 54. Instead, the upper and lower edges of flange 48 could have the same close axial clearance relative to the housing cover 44 and scroll housing upper surface 28. The same diameter filter 62, but slightly axially thicker, could be snugly fitted directly between the cover 44 and scroll housing upper surface 28, rather than between door shelves 52 and 54. In that case the filter 62 would be stationary to the housing 36, and would not turn with the door 46, but the same basic air flow patterns would obtain. However, the upper shelf 52, at least, is preferred, since it provides a convenient location for the key 58 to fit through cover 44 and into actuator 60. It would be more difficult to install and turn door 46 otherwise. Theoretically, only the upper door shelf 52 could be provided, and the lower surface of filter 62 could abut directly against the scroll housing upper surface 28, rather than against the inside of a matching lower door shelf 54. However, then there would be a rubbing interface against the filter 62, which could retard the turning of door 46. Therefore, it will be understood that it is not intended to limit the invention to just the embodiment disclosed.

It is claimed:

1. In combination with an automotive heating, ventilating and air conditioning system having a cylindrical blower rotatable about a central axis within a coaxial scroll housing having a substantially flat surface that is substantially perpendicular to said central axis and also having a central opening to said blower, so that said blower draws air axially into and through said central opening, a low profile air inlet assembly, comprising:

a generally cylindrical inlet housing coaxial to said scroll housing having a perimeter wall of predetermined axial height surrounding said central opening with one edge fixed to said scroll flat surface and a pair of substantially diametrically opposed inlets leaving a pair of substantially diametrically opposed, partially cylindrical webs intermediate said two inlets, said housing also having a substantially flat cover closing the other edge of said perimeter wall and axially spaced from said scroll housing flat surface;

a generally cylindrical rotating door located inside of and coaxial to said inlet housing beneath said housing upper cover, said rotating door having a partially cylindrical flange with an axial height just slightly less than the height of said housing perimeter wall and a diameter just slightly smaller than the diameter of said perimeter wall and subtending an arc sufficiently large to circumferentially and axially block either of said inlet housing inlets while simultaneously circumferentially overlapping radially closely with both of said perimeter wall webs; and, a cylindrical filter located concentrically inside of said rotating door and axially closely between said scroll housing flat surface and said inlet housing cover, said filter having an outer surface that is radially spaced from said door cylindrical flange, whereby said door can be selectively rotated to block either of said inlets and allow air to be drawn into said inlet housing through the opposed, open inlet, which then flows radially inside of said door flange and axially between said scroll housing flat surface and inlet housing cover, then radially inwardly through said filter and ultimately through said scroll housing central opening and into said blower.

2. In combination with an automotive heating, ventilating and air conditioning system having a cylindrical blower rotatable about a central axis within a coaxial scroll housing having a substantially flat surface that is substantially perpendicular to said central axis and also having a central opening to said blower, so that said blower draws air axially into and through said central opening, a low profile air inlet assembly, comprising:

a generally cylindrical inlet housing coaxial to said scroll housing having a perimeter wall of predetermined axial height surrounding said central opening with a lower edge fixed to said scroll flat surface and a pair of substantially diametrically opposed inlets leaving a pair of substantially diametrically opposed, partially cylindrical webs intermediate said two inlets, said housing also having a substantially flat cover closing one edge of said perimeter wall and axially spaced from said scroll housing flat surface;

a generally cylindrical rotating door located inside of and coaxial to said inlet housing beneath said housing upper cover, said rotating door having a partially cylindrical flange with an axial height just slightly less than the height of said housing perimeter wall and a diameter just slightly smaller than the diameter of said perimeter wall and subtending an arc sufficiently large to circumferentially and axially block either of said inlet housing inlets while simultaneously circumferentially overlapping radially closely with both of said perimeter wall webs, said door also having a pair of substantially flat, axially spaced shelves closing the edges of said cylindrical flange; and, a cylindrical filter located concentrically inside of said rotating door and axially closely between said door shelves, said filter having an outer surface that is radially spaced from said door cylindrical flange, whereby said door can be selectively rotated with said filter inside to block either of said inlets and allow air to be drawn into said inlet housing through the opposed, open inlet, which then flows radially inside of said door flange and axially between said spaced shelves, then radially inwardly through said filter and ultimately through said scroll housing central opening and into said blower.

\* \* \* \* \*